(No Model.)

J. W. D. FIFIELD.
BOOT AND SHOE CRIMPING MACHINE.

No. 248,438. Patented Oct. 18, 1881.

Witnesses.

Inventor:
John W. D. Fifield,
by Crosby & Gregory,
Attys

UNITED STATES PATENT OFFICE.

JOHN W. D. FIFIELD, OF NORTH BROOKFIELD, MASSACHUSETTS.

BOOT AND SHOE CRIMPING MACHINE.

SPECIFICATION forming part of Letters Patent No. 248,438, dated October 18, 1881.

Application filed August 8, 1881. (No model.)

*To all whom it may concern:*

Be it known that I, JOHN W. D. FIFIELD, of North Brookfield, county of Worcester and State of Massachusetts, have invented a new and useful Improvement in Boot and Shoe Crimping-Machines, of which the following description, in connection with the accompanying drawings, is a specification.

My invention in crimping-machines for the fronts of boots and vamps of shoes consists in a form and jaws combined with right and left hand actuating-screws, to cause the form and jaws to simultaneously move toward or from each other; also, in a pair of jaws, each supported at but one end upon a traveling nut, the end of each jaw not so connected with a nut being attached in a yielding manner to the end of the opposite jaw.

Figure 1:
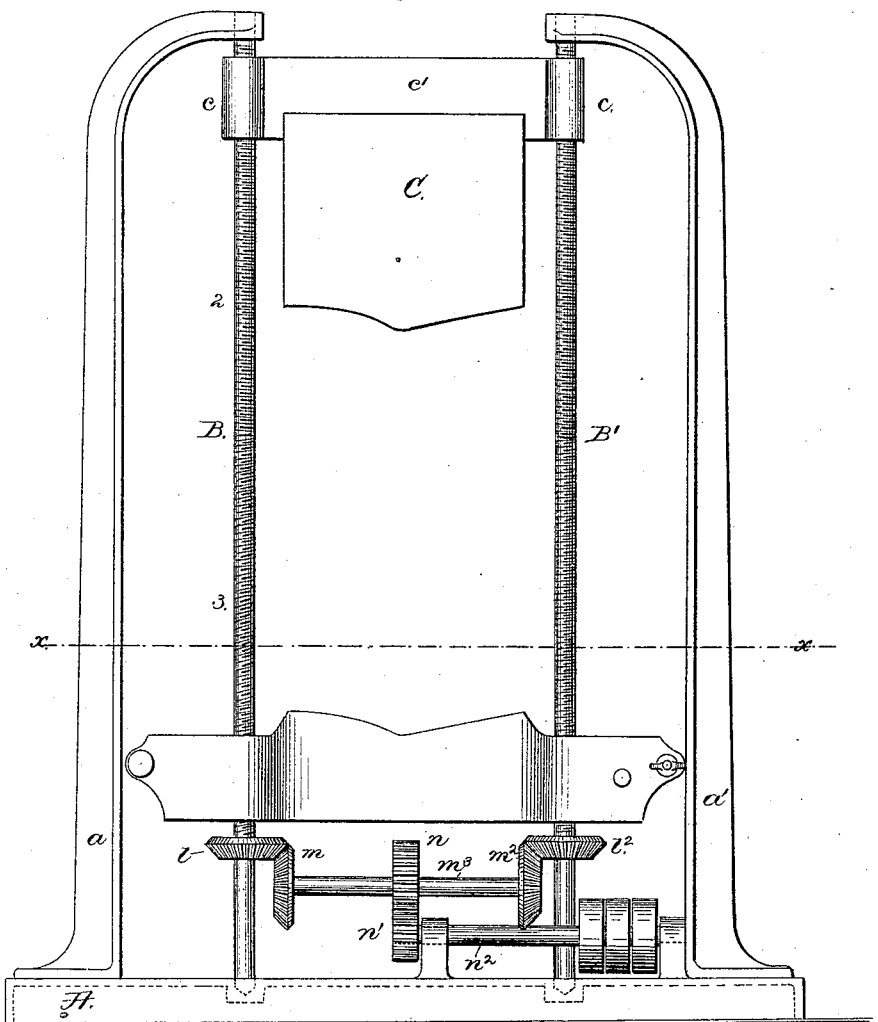
Figure 2:
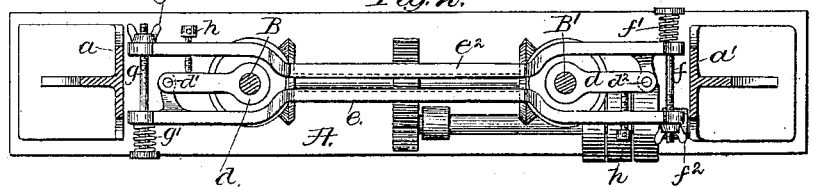

Figure 1 represents, in side elevation, a crimping-machine embodying my invention, the form being fully raised and the jaws fully lowered; and Fig. 2 a section on the dotted line $x$ $x$, Fig. 1.

The base A of the machine has two upright standards, $a$ $a'$, curved at top to hold the upper ends of two long screws, B B', having their lower ends fitted to turn in suitable footsteps or bearings. (Shown in dotted lines, Fig. 1, on the base A.) These screws from at or near the middle of their length are threaded reversely in opposite directions—that is, one-half of the screw has a right-hand and the other half a left-hand thread. The left-hand threaded parts 2 of the screws enter the threaded sleeves $c$ of the cross-bar $c'$, which carries the form C, while the right-hand threaded parts 3 enter the nuts $d$, having outwardly-extended arms, as shown clearly in Fig. 2, upon one of which at $d'$ is pivoted the jaw $e$, while upon the arm of the other nut at $d^2$ is pivoted the opposite end of the other jaw $e^2$. The end of jaw $e$ not pivoted upon the nut $d$ is connected with that end of jaw $e^2$ which is pivoted to a nut, $d$, by means of a bolt, $f$, surrounded by a spiral spring, $f'$. The end of jaw $e^2$ which is not pivoted to one of the said nuts is joined by a bolt, $g$, with the end of jaw $e$ beyond its connection with one of the nuts $d$, the said bolt having a spring, $g'$.

The springs $f'$ $g'$ on these bolts $f$ $g$ keep the jaws $e$ $e^2$ pressed toward each other and permit them to yield or separate a little as the form C with a boot front or shoe upper or quarter is made to pass into the space between the jaws.

The active force of the springs may be regulated by the thumb-nuts $f^2$ $g^2$.

The adjusting-screws $h$ $h$ regulate the space between the jaws in their closed position.

The screw B has a bevel-gear, $l$, and screw B', a bevel-gear, $l^2$, of same size, which are engaged and driven by the bevel-gears $m$ $m^2$ on the shaft $m^3$, it having on it a toothed gear, $n$, set in motion by a gear, $n'$, on the main driven shaft $n^2$, provided at one end with a set of one loose and two fast pulleys, which, in practice, are driven alternately one by an open and the other by a crossed belt controlled by a belt-shipper, all of usual construction, whereby the main driven shaft $n^2$ may be revolved for a proper length of time in one, and then by shifting the belts in an opposite direction to actuate the screws B B' first in one and then in the other direction, and cause the form and jaws to approach and the form to pass into and between the jaws, and then to recede or move in opposite directions into the position, Fig. 1.

The mechanism so far described makes a very simple, cheap, and effective crimping-machine.

If the screws B B' had threads running in but one direction they could be made to move either the form or the jaws, one or the other remaining at rest; but such construction would be wasteful of time.

I claim—

1. A crimping-machine composed of a form and jaws and two screws in engagement therewith, each provided with right and left hand threads, whereby the jaws and form are simultaneously moved toward and then away from each other, substantially as described.

2. The jaws $e$ $e^2$, each pivoted at one end upon traveling nuts of the screws B B', the free end of each jaw being connected with the pivoted end of the other jaw in a yielding manner, to permit the jaws to separate as the form and leather thereon pass between them, substantially as described.

3. The driven shaft $n^2$, its gear, the shaft $m^3$, its gear $n$, and bevel-gears $m$ $m^2$, combined with the bevel-gears $l$ $l^2$, and screws B B', to operate the form and carrier, or either, substantially as described.

In testimony whereof I have signed my name to this specification in the presence of two subscribing witnesses.

JOHN W. D. FIFIELD.

Witnesses:
HENRY J. NEWMAN,
W. H. HOLT.